Figure 1:
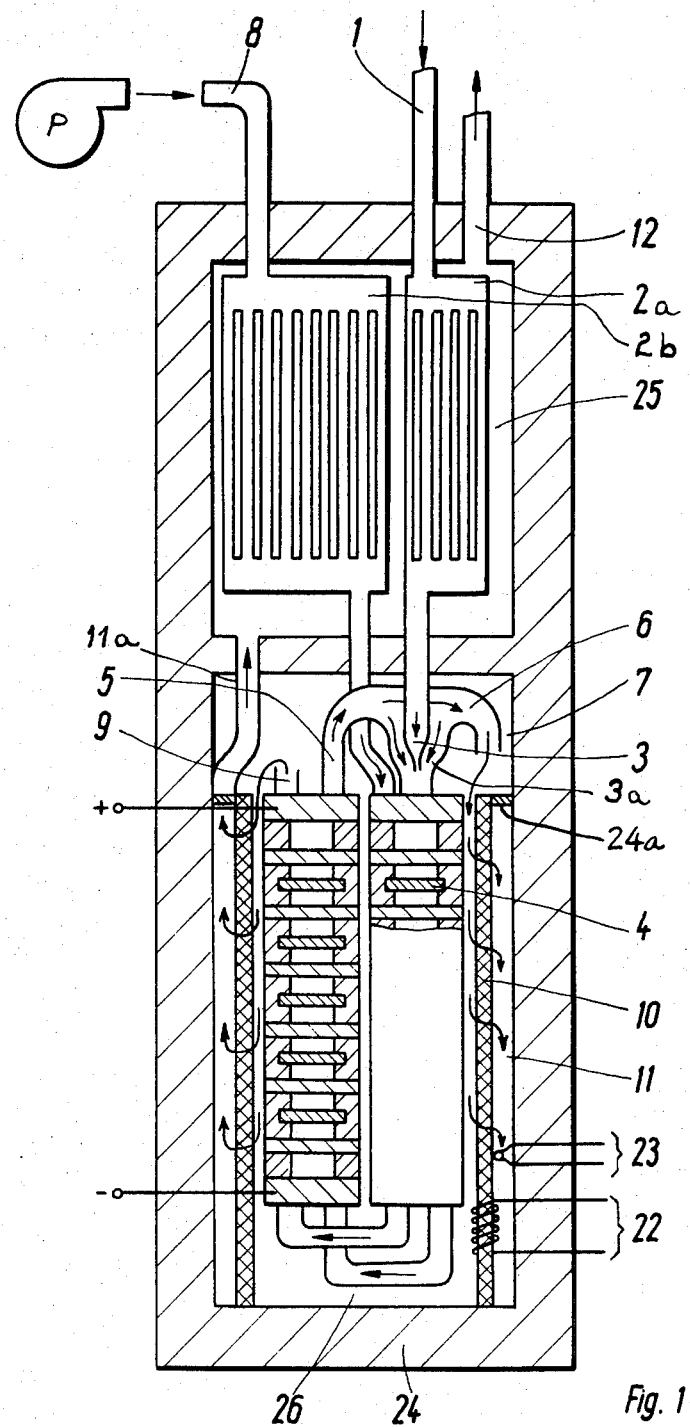

United States Patent
Fischer et al.

[11] 3,718,506
[45] Feb. 27, 1973

[54] FUEL CELL SYSTEM FOR REACTING HYDROCARBONS

[75] Inventors: Wilfried Fischer, Neckargemund; Franz-Josef Rohr, Ober-Absteinach, both of Germany

[73] Assignee: Aktiengesellschaft Brown, Boveri & Cie, Baden, Switzerland

[22] Filed: Feb. 22, 1971

[21] Appl. No.: 117,381

[52] U.S. Cl. ............................................. 136/86 C
[51] Int. Cl. ........................................... H01m 27/00
[58] Field of Search ........................................ 136/86

[56] References Cited

UNITED STATES PATENTS

| | | | |
|---|---|---|---|
| 2,980,749 | 4/1961 | Broers | 136/86 R |
| 3,146,131 | 8/1964 | Linden et al. | 136/86 R |
| 3,436,271 | 4/1969 | Cole | 136/86 E |
| 3,516,807 | 6/1970 | West et al. | 136/86 R |
| 3,577,329 | 5/1971 | Shalit | 136/86 C |

Primary Examiner—Helen M. McCarthy
Assistant Examiner—H. A. Feeley
Attorney—Pierce, Scheffler & Parker

[57] ABSTRACT

A fuel cell system of the high temperature type includes one or more fuel cells operating with an electrolyte such as an oxygen ion conductive solid or a carbonate melt to which fresh reaction gases containing hydrocarbon fuel and oxygen respectively are fed after preheating in heat exchangers. The system may also include a separate reformer for converting the hydrocarbons into hydrogen and other gases. A portion of the exhaust gases from the fuel side of the cell is recycled through the fuel cell by entrainment with fresh fuel gas by means of the aspirating effect of a nozzle through which fresh fuel gas is injected into the cell and the remainder of the exhaust gas from the fuel side together with oxygen impoverished gas discharged from the cell are led to an after-combustion catalyst in the form of a tubular structure surrounding the fuel cells and also the reformer component if one is utilized for burning of the remaining hydrocarbon content of the fuel gas. The heat generated during the after-burning phase in the catalytic zone is mostly transferred over a very short path to the fuel cells to maintain the fuel cells at their proper operating temperature and to supply the power requirements of the reformer if the latter is utilized. The remaining heat in the exhaust gases is conducted to the exchangers for heat transfer to the incoming fresh reaction gases.

6 Claims, 2 Drawing Figures

Inventors
Wilfried Fischer
Franz-Josef Rohr

FUEL CELL SYSTEM FOR REACTING HYDROCARBONS

The present invention relates to an improved fuel cell system for conversion of the combustion enthalpy of hydrocarbons into electrical energy. The system includes one or more relatively high-temperature fuel cells utilizing an electrolyte either in the form of an oxygen-ion-conductive solid or a carbonate melt, and a heat exchanger for effecting preheating of the entering, relatively cold, reaction gases such as air and propane by heat absorption from relatively hot exhaust gases, and also in some cases a reformer for converting the hydrocarbons in the gaseous fuel to hydrogen and other gases prior to entering the fuel cells themselves.

It is known that hydrocarbons can be re-formed above a temperature of 500°C, i.e. they can be converted with steam and/or carbon dioxide into hydrogen and carbon monoxide. In addition, fuel cells have already been suggested in which reformed hydrocarbons are converted into electrical energy. In this connection, reference is made to an article by H. Binder et al., in Electrochem. Acta 8, 781, (1963). Reformation of the hydrocarbons can be effected either in a catalyst containing reactor arranged in the flow path ahead of the fuel cells or on the fuel cell anode.

Since reformation of the hydrocarbons takes place at temperatures above 500°C, the fuel cells must be operated, because of the heat balance, at the same or even a higher temperature. In the fuel cells, heat is released; in reformation of the hydrocarbons, heat is absorbed. For this reason, fuel cells with an oxygen-ion-conductive solid electrolyte, or those with a carbonate melt as an electrolyte are utilized. The operating temperatures of such fuel cells lie between 500° and 1,200°C. See, for example, Swiss patents Nos. 429,858 and 446,456.

If hydrocarbons are to be reacted efficiently and essentially maintenance-free in a fuel cell system, the gas- and heat currents must be so conducted that optimum operating parameters can be set and maintained at the desired load output of the system. To this end:

1. It should be possible to start the system cold and to operate it continuously without the need for extraneous auxiliary equipment and without moving parts as much as possible.
2. the heat balance should be positive at each load level.
3. the operating temperature should be regulable.
4. formation of soot within the cell and reformer components of the system due to decomposition of the hydrocarbons should be avoided.
5. the fuel should be consumed as completely as possible.

In a known high temperature fuel cell system, e.g. as disclosed in German Patent Application P 15 71 986.5–45, the reaction gases are conducted through a heat exchanger. Starting of the system is effected by flame-heating, and formation of soot is prevented by connecting pipes between the fuel- and exhaust lines in the heat exchanger, which has the effect that not only fuel gas, but also a fuel-exhaust gas mixture, is fed to the fuel cell or cells. For this reason, the aforesaid requirements (1 to 5) can be met in principle. However, starting of the system by flame heating is technically unsatisfactory. The exhaust gas (to prevent formation of soot) is added to the fuel gas in the heat exchanger, hence at a point where the exhaust gas is already partially cooled. This has an adverse effect on the heat balance. Finally, the fuel content in the exhaust gas current issuing from the installation (it is unavoidable that a part of the fuel is not consumed electrochemically) is lost for the maintenance of the heat balance.

A pipe constriction, or a nozzle, to carry along a second gas is described, e.g. in the Newsletter of General Instrument Corporation, June, 1969, "G.I. Deliveries 120 W TEMAR Boy Power Source."

In a fuel cell installation described by S. Baker (Baker et al., "High Temperature Natural Gas Fuel Cells," 1965), in Fuel Cell Systems, Advances in Chemistry Series 47 (1965), p. 247, in which a carbonate melt serves as the electrolyte within the cells, the hydrocarbon is fed together with steam to the fuel cell-battery by way of a reformer. The heat content of the exhaust gases is utilized to cover the heat requirement of the endothermic reformer-reaction. The exhaust gases containing $CO_2$ are fed to the cathode to cover the $CO_2$ consumption due to the cathode reaction:

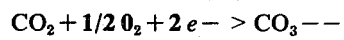

$$CO_2 + 1/2\, O_2 + 2\,e- \;>\; CO_3--$$

Because the exhaust gas containing $H_2O$ and $CO_2$ is mixed with air, the addition of $H_2O$ and $CO_2$ to the fuel necessary to prevent formation of soot cannot be covered directly from the same exhaust gas current. Rather the water required for the reformation process can only be recovered from the exhaust gas mixture mixed with air by separating it from the air by condensation.

The related further evaporation and heating then requires so much energy that the heat content either cannot, or at best can only be maintained with a very low efficiency.

Furthermore, it is known from other fields of application to utilize catalysts for after-combustion of the remaining fuel not reacted electrochemically in the cells. In this connection, reference is made to an article by E. Hermann, "Apparatus and Plants For Catalytic After-Combustion" Chem. Ing. Technik 37, pages 905 and 912, 1965. The combustion of a fuel gas is here effected on a catalyst wall to which the fuel gas and the air are fed from different sides. But in the above-mentioned Newsletter of General Instrument Corp. hydrocarbon and air are fed to the catalyst from the same side.

Summarizing the above-mentioned five requirements, the principal object of the present invention is to utilize the portion of the combustion heat content of the fuel gas not converted into electrical energy as fully as possible for maintaining the operating temperature and to effect the supply and mixing of the reaction gases with the use of as few auxiliary devices as possible such as pumps, etc., and thus to realize an essentially maintenance-free and easy-to-start system. This desired objective is made practical according to the invention in a technically advantageous manner, starting from the aforementioned known techniques, primarily by a combination of the following measures:

The fuel gas is conducted after passing through the heat exchanger and in advance of the fuel cell battery, as well as in advance of a reformer, if one is provided, through a nozzle over which passes a portion of the exhaust gas from the fuel side of the fuel cell battery. The jet of fresh fuel issuing from the nozzle thus functions as a jet pump or aspirator entraining with it the surrounding exhaust gas so as to recycle this portion of the exhaust gas through the fuel cells and a separate reformer also, if provided, along with fresh fuel thus to avoid formation of soot within the cells and reformer without preceding cooling and without the necessity for providing a separate auxiliary pump for this purpose. The part of the anode exhaust gas not re-cycled through the fuel cell is fed to an after-combustion catalyst. The air now impoverished in $O_2$ is likewise supplied to the catalyst from the exhaust side of the fuel cell. This can be effected on the same, or opposite side of a porous catalyst wall to which the fuel exhaust gas is conducted. In this manner, after-combustion of the fuel portion which was not reacted electrochemically within the cells is made possible. The combustion heat, in addition to the heat generated internally in the fuel cell battery due to an operating efficiency of less than 1, serves to maintain the operating temperature of the fuel cell battery, to cover the heat requirement of the endothermic reformation reaction and to heat the battery from its initial cold state for starting. In addition, the operating temperature of the fuel cell battery can be easily regulated in this manner since the after-combustion heat (with the same electric power) is increased, or reduced, as the case may be by adding more or less fuel.

Figure 2:
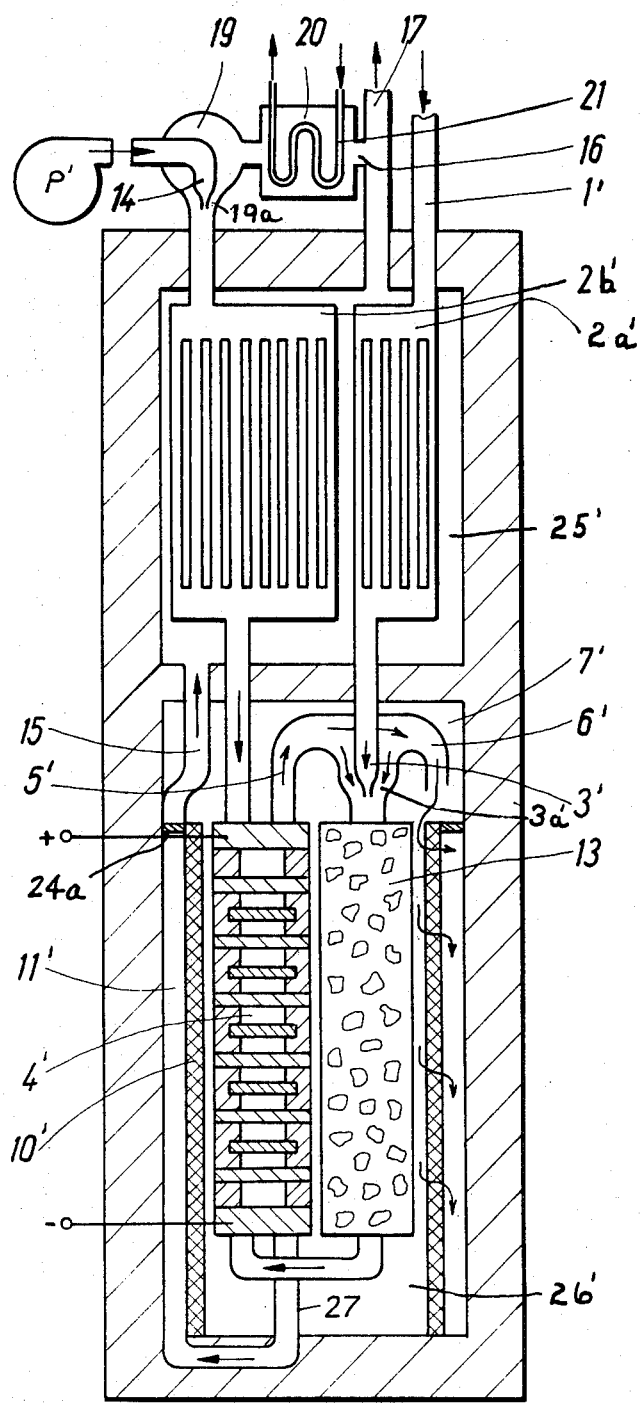

The improved fuel cell battery structure in accordance with the invention will now be described in more detail with reference to two embodiments thereof and which are illustrated in the accompanying drawings wherein:

FIG. 1 is a view in longitudinal section through a completely housed fuel cell battery and utilizes a ceramic oxygen-ion-conductive solid electrolyte; and FIG. 2 is also a view in longitudinal section through a slightly different fuel cell battery in which all operating components are housed but utilizing as an electrolyte for the fuel cell system a carbonate melt and also a separate reformer located in the gas flow path in advance of the fuel cells.

With reference now to FIG. 1, the fuel cell battery is of the type wherein an electrolyte in the form of a ceramic oxygen-ion-conductive solid is utilized, and wherein re-formation of the hydrocarbon takes place at the anodes of the fuel cells. Fuel gas, e.g. propane is fed through a tube 1 from a source of supply, not illustrated, into and through a heat exchanger 2a where it is pre-heated by the final exhaust gases from the battery and thence through a nozzle 3 into the first of a plurality of the solid electrolyte fuel cell modules 4 arranged in series. After leaving the first cell, the fuel gas enters and flows through the second cell, the fuel gas being partly consumed electrochemically as it flows through the cells. The mixture of combustion gases and un-reacted fuel flows out of the last cell 4 in the series in exit pipe 5, and a portion of this exhaust gas mixture is, in accordance with the invention, recycled through the fuel cells. More particularly, a portion of the gas mixture flowing through pipe 5 is delivered into an annular duct arrangement 3a surrounding the nozzle 3 where it is drawn, i.e. aspirated, into the fuel cell 4 along with fresh fuel gas discharged from nozzle 3, in accordance with the jet pump principle. Nozzle 3 is so dimensioned that the quantity of combustion gas re-cycled into the fuel cells is greater than the propane, actually about three times as much. In this manner, formation of soot within the cells is avoided. The remainder of the exhaust gas mixture, i.e. the portion not re-entering the fuel cells, flows out of the exit pipe 6 into the upper part 7 of one chamber 26 provided in housing 24 for receiving the fuel cells 4. A tubular porous catalytic afterburner structure 10 surrounding the fuel cells reaches to the bottom wall of housing 24 which establishes the lower boundary wall for chamber 26, and the tubular after-burner 10 itself also defines a boundary wall for chamber 26 and through which the exhaust gas mixture from the fuel cells is caused to flow.

Air to furnish oxygen for the fuel cells is delivered by pump P into pipe 8 from whence it flows into and through heat exchanger 2b where it is also preheated by the final exhaust gases from the battery. The air then flows into and through the fuel cell modules 4 where its oxygen content is partly consumed and is then exhausted from pipe 9 at the exit from the last cell in the series into chamber part 7. As indicated in the drawing, the surface area for the heat exchanger 2b for the entering air is seen to be much greater than that of the heat exchanger 2a for the entering propane. Assuming that for the illustrated embodiment twice as much oxygen is supplied as is consumed electrochemically within the fuel cells, the surface area of heat exchanger 2b will be ten times greater than that of heat exchanger 2a, this for the reason that the amounts of heat to be supplied are in a ratio of about 10 : 1.

From the chamber part 7, the gaseous mixture therein of combustion gas, un-reacted fuel, oxygen and nitrogen flows into the space containing the fuel cells 4 and thence laterally outward through the porous catalyst tube 10 of the afterburner-catalyzer into a chamber 11 formed between catalyst tube 10 and the side wall of housing 24, this chamber being separated from the fuel cell chamber 26 by a ring-shaped end closure wall 24a at the upper end of tube 10. The remainder of the fuel gas is burned in the catalyzer tube 10 which surrounds the fuel cells 4 and the resulting heat flowing over a short path to the fuel cell helps, to maintain the operating temperature of the fuel cells at about 800°C. Heat produced by the catalyzer 10 is also used for starting up of the fuel cells from their cold state.

When starting the battery in a cold state, the gases are at first flowed through the cells 4 unused to the catalyst tube 10. Catalystic combustion is possible, starting from a temperature of about 200°C, i.e. it suffices to bring one point of the catalyst tube 10 to this temperature by an electric heater in the form of a coiled hot wire filament 22, and then this points heats itself and the surrounding neighborhood. With rising temperature, more and more of the gases are reacted electrochemically in the fuel cells. A temperature regulator 23 is employed to shut off the supply of current to filament 22 at a nominal reference temperature value above 200°C. Temperature regulator 23 and hot-wire filament 22 are integrated into the housing 24, but it is also possible to join up the ignition device by means of a plug connection.

The exhaust gas after transfer of heat to the fuel cells 4 and flowing from the catalyzer 10 into chamber 11, and no longer containing any un-reacted fuel, is discharged from pipe 11a into chamber another 25 in housing 24 which houses the heat exchangers 2a, 2b and gives up most of its remaining heat content to the latter. Final discharge of the cooled exhaust gases is from chamber 25 to the atmosphere through a pipe 12.

In the embodiment illustrated in FIG. 2, the fuel cells are of the type wherein a carbonate melt is utilized as the electrolyte. Re-formation of the hydrocarbon is effected in a separate reformer component arranged in the gas flow path in advance of the fuel cells 4'.

The hydrocarbon fuel gas is conducted under pressure from a source of supply through a tube 1' into and through heat exchangers 2a' in the same manner as in the embodiment of FIG. 1. However, prior to entering the fuel cells located in chamber 26', the fuel gas is fed through a nozzle 3' to the reformer tubes of a reformer component 13 filled with catalyst material. After leaving reformer 13, also located in chamber 26', the fuel gas is passed through the one or more fuel cells 4' and discharges from the latter through pipe 5'. In the interest of simplicity, only one fuel cell 4' is depicted in FIG. 2. However, several such cells may be utilized in the manner of FIG. 1. A part of the exhaust gases issuing from pipe 5' enter a duct 3a' surrounding nozzle 3' and are re-cycled through reformer 13, and hence also through the fuel cells 4', by the jet pump action of nozzle 3'. These exhaust gases contain $H_2O$ and $CO_2$ and the addition of these serve to prevent deposit of soot within the reformer 13 as well as in the fuel cells 4'. The fuel-exhaust mixture entering the fuel cells, heated to the temperature of the reformer, is reacted at least in part electrochemically upon power consumption.

The portion of the exhaust gases from the fuel cells 4' that is not re-cycled through reformer 13 is discharged through pipe 6' into chamber 7'.

Air to furnish oxygen for the fuel cells is supplied from pump P' through a pipe and nozzle 14 into and through heat exchanger 2b' for pre-heating and thence into and through the fuel cells 4'. A portion of the oxygen content in the air is consumed in the cells and the remaining composition discharged from the fuel cells is passed through pipe 27 into chamber 11' by-passing the catalyst tube 10' through which flows from the inner side of the catalyst tube, from chamber 26', the exhaust gas mixture on the fuel side. The remaining fuel is consumed in this catalyst tube. As in the case of the embodiment of FIG. 1, heat produced by afterburning at the catalyst tube 10' is transferred over a short path to the fuel cells 4' to maintain the cells at their proper operating temperature and to also supply the power requirement of the reformer 13. All exhaust gases are then conducted out of chamber 11' through a tube 15 into and through chamber 25' which houses the heat exchangers 2a' and 2b' and are discharged through an outlet pipe having two branches 16, 17. A portion of the exhaust gases flows directly to the atmosphere through branch pipe 17. The remainder of the exhaust gases, however, is lead through branch pipe 16 into and through a condenser 20 in which a coolant is circulated through a coil 21. Water in the exhaust gases is removed by condenser 20 and the so treated exhaust gases are then conducted to a mixing chamber 19 which includes a duct portion 19a enveloping fresh air nozzle 14 that serves to effect re-cycling of the dried exhaust gases by means of the jet pump action established by nozzle 14. The dried combustion products added to the fresh air contain among others $CO_2$ which must be present on the cathode side of the fuel cells 4' so that the carbonate ions consumed on the anode side can be produced again on the cathode side. In this connection, reference is made to the above-mentioned article by Baker et al.

Starting of the fuel cell system depicted in FIG. 2 is effected in a manner similar to that described in connection with the FIG. 1 embodiment.

In conclusion, the improved fuel cell arrangements in accordance with the inventive concept as herein described thus combine the following advantageous measures:

1. Heat exchange wherein heat from the hot exhaust gases is absorbed by the entering reaction gases with optimum dimensioning of their respective heat exchange surface areas.

2. Mixing exhaust gases with fresh fuel entering the fuel cells and also a separate reformer, if provided, by jet pump action of a fuel gas nozzle within the battery to prevent formation of soot within the fuel cells and reformer.

3. Catalytic after-combustion of the remainder of the fuel gas to cover the heat requirement of the fuel cells and of the heat exchanger.

4. Supply of $CO_2$ with fresh air to the cathode side of the fuel cells.

5. Starting of the fuel system with low power.

6. Closed transportable arrangement of the various components of the fuel cell system.

We claim:

1. A high temperature fuel cell battery which comprises a housing providing therein a first chamber in which are located one or more fuel cells of the high temperature type operating with an electrolyte such as an oxygen ion conductive solid or a carbonate melt and to which fresh reaction gases containing hydrocarbon fuel and oxygen respectively are fed, a tubular porous catalytic afterburner structure surrounding said fuel cells, means for initially heating said afterburner structure, first and second heat exchangers located in a second chamber of said housing for preheating respectively the fresh fuel and oxygen containing gases in advance of being introduced into said fuel cells for reaction, fuel and oxygen containing gas conduits connecting the outlets from said heat exchangers with said fuel cells, said fuel gas conduit including a jet pump located in said first chamber and actuated by the fresh fuel gas and including means for delivering a portion of the exhaust gas mixture from said fuel cells thereto so as to be entrained with fresh fuel gas for recycling through said fuel cells, said jet pump being so dimensioned that the quantity of combustion gas in the exhaust gas mixture is greater than the fresh fuel gas thereby to minimize formation of soot within the fuel cells, the remaining portion of the exhaust gas mixture from said fuel cells being delivered to the interior of said tubular catalytic afterburner structure for flow in an outwardly direction therethrough into a third chamber provided within said housing, the remaining hydrocarbon content in said exhaust gas mixture being burned in said afterburner structure and generating heat which is transferred inwardly therefrom to said fuel cells for maintaining said cells at their proper operating temperature, and conduit means for connecting said third chamber with said second chamber for delivering the burned gases to said first and second heat exchangers.

2. A high temperature fuel cell battery as defined in claim 1 wherein said means for initially heating said after-burner structure includes an electrically heated filament located in heat transfer relation therewith.

3. A high temperature fuel cell battery as defined in claim 2 and which further includes a temperature regulator for effecting a shut-off of the electrical current applied to said filament when said filament has attained a nominal temperature characteristic of independent continuation of the after-combustion reaction.

4. A high temperature fuel battery as defined in claim 1 wherein a carbonate melt serves as the electrolyte for the fuel cells and which further includes a mixing chamber in which fresh oxygen containing gas is mixed with gas exhausted from said heat exchangers prior to entering said second heat exchanger.

5. A high temperature fuel cell battery as defined in claim 4 wherein one portion of the gas exhausted from said heat exchangers is discharged to atmosphere and another portion thereof is led to said mixing chamber by way of a condenser to effect removal of its moisture content.

6. A high temperature fuel cell battery as defined in claim 1 and which further includes a reformer through which fresh fuel gas combined with a portion of the exhaust gas mixture by the action of said jet pump is fed prior to being introduced into said fuel cells, said reformer being also surrounded by said tubular catalytic afterburner structure and which receives heat therefrom to furnish its power requirement.

* * * * *